United States Patent
Dupret et al.

(10) Patent No.: US 9,355,434 B2
(45) Date of Patent: May 31, 2016

(54) METHOD AND DEVICE FOR RECONSTRUCTING SUPER-RESOLUTION IMAGES

(71) Applicant: COMMISSARIAT A L'ENERGIE ATOMIQUE ET AUX ENERGIES ALTERNATIVES, Paris (FR)

(72) Inventors: Antoine Dupret, Orsay (FR); Laurent Alacoque, Voreppe (FR); Tien Ho Phuoc, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/419,429

(22) PCT Filed: Aug. 5, 2013

(86) PCT No.: PCT/FR2013/051885
§ 371 (c)(1),
(2) Date: Feb. 3, 2015

(87) PCT Pub. No.: WO2014/023904
PCT Pub. Date: Feb. 13, 2014

(65) Prior Publication Data
US 2015/0213579 A1    Jul. 30, 2015

(30) Foreign Application Priority Data

Aug. 6, 2012   (FR) ..................................... 12 57632

(51) Int. Cl.
*G06K 9/32*        (2006.01)
*G06T 3/40*        (2006.01)
(Continued)

(52) U.S. Cl.
CPC ............. *G06T 3/4076* (2013.01); *G06T 3/4007* (2013.01); *G06T 3/4053* (2013.01);
(Continued)

(58) Field of Classification Search
CPC ..................... G06T 11/60; G06T 2207/10004; G06T 2207/20221; G06T 3/4007; G06T 3/4053; G06T 3/4076; G06T 5/003; G06T 7/0081; H04N 13/0011; H04N 13/0029; H04N 13/0282
USPC ........................................................ 382/300
See application file for complete search history.

(56) References Cited

U.S. PATENT DOCUMENTS 6,937,774 B1    8/2005    Specht et al.
7,477,802 B2    1/2009    Milanfar et al.
(Continued)

FOREIGN PATENT DOCUMENTS

| EP | 1860875 | 11/2007 |
|---|---|---|
| WO | 2011092696 | 8/2011 |
| WO | 2014023904 | 2/2014 |

OTHER PUBLICATIONS

EPO, International Search Report for PCT/FR2013/051885, dated Oct. 11, 2013.
(Continued)

*Primary Examiner* — Ali Bayat
(74) *Attorney, Agent, or Firm* — Kevin R Erdman; Brannon Sowers & Cracraft PC (57) ABSTRACT

The invention relates to a method for generating super-resolution images using a processing device, the method includes: oversampling an input image to generate an oversampled image; modifying the pixel value of a first pixel of the oversampled image by: generating a similarity value for each one of a plurality of candidate pixels in the input image and/or in one or more other input images, candidate pixels being selected based on the position of the first pixel in the oversampled image, similarity value being generated by evaluating the similarity of a group of pixels adjacent to each of the candidate pixels to a group of pixels adjacent to the first pixel; selecting a first subset of candidate pixels on the basis of similarity values, and generating the modified pixel value of the first pixel based on the pixel values and on the similarity values of the first subset of candidate pixels.

20 Claims, 4 Drawing Sheets

(51) Int. Cl.
*G06T 5/00* (2006.01)
*G06T 7/00* (2006.01)
*G06T 11/60* (2006.01)

(52) U.S. Cl.
CPC .............. *G06T 5/003* (2013.01); *G06T 7/0081* (2013.01); *G06T 11/60* (2013.01); *G06T 2207/10004* (2013.01); *G06T 2207/20221* (2013.01)

(56) References Cited

U.S. PATENT DOCUMENTS

| 8,698,832 | B1* | 4/2014 | Lewis | 345/589 |
| 2009/0110285 | A1* | 4/2009 | Elad et al. | 382/190 |
| 2010/0141804 | A1 | 6/2010 | Morel et al. | |
| 2012/0113219 | A1* | 5/2012 | Chang et al. | 348/43 |

OTHER PUBLICATIONS

"Restoration of a Single Superresolution Image from Several Blurred, Noisy, and Undersampled Measured Images," Michael Elad, IEEE Transactions on Image Processing, Vol. 6, No. 12, Dec. 1997.

"Example-Based Super-Resolution," William T. Freeman, Image-Based Modeling, Rendering, and Lighting, IEEE Computer Graphics and Applications, Mar. 2002.

"A Combined Corner and Edge Detector," Chris Harris, Plessey Research Roke Manor, United Kingdom © The Plessey Company pic. 1988.

* cited by examiner

METHOD AND DEVICE FOR RECONSTRUCTING SUPER-RESOLUTION IMAGES

CROSS-REFERENCE TO RELATED APPLICATIONS

The present application is a National Stage of PCT International Application Serial Number PCT/FR2013/051885 filed Aug. 5, 2013, which claims priority under 35 U.S.C. §119 of French Patent Application Serial Number 12/57632, filed Aug. 6, 2012, the disclosures of which are incorporated by reference herein.

BACKGROUND OF THE INVENTION

1. Field of the Invention

It is often desirable to increase the resolution of an image. For example, certain imagers, such as terahertz (THz), infrared (IR) or low cost imagers may capture low-resolution images. By increasing the resolution of one or more of the low-resolution images, the image quality can be improved.

A super-resolution image may be reconstructed from a plurality of low-resolution images of a same scene. For example, the images may correspond to a sequence of frames of a video stream captured by an imager. By combining the visual information from multiple images, the total amount of visual information can be increased in the super-resolution image. Indeed, because each low-resolution image is in some way different from the others, it contributes some unique information that is absent from the other images.

A method of generating a super resolution image based on multiple low-resolution images generally involves up-scaling one of the low-resolution images, and then modifying the pixel values of the up-scaled image based on pixel values taken from the low-resolution images.

However, there is a technical problem in accurately selecting the pixel values to be used for this pixel modification. Indeed, the selected pixel values should correspond to pixels having positions in their respective images that accurately match the position of the pixel to be adjusted. Any miss-match between the pixel positions will result in added noise and thus a reduced image quality.

One technique that has been proposed for matching the pixel positions is to estimate the motion of objects from the differences between the low-resolution images. However, such motion estimation is difficult and complex to perform, and can be imprecise, particularly in the case of objects that make non-continuous or non-uniform movements.

US patent application N°US2009/0110285 describes a method of super-resolution image reconstruction that does not rely on motion estimation directly. Instead, the method compares pixel values of pixels surrounding a target pixel with pixel values of pixels surrounding pixels in the target pixel's neighborhood in neighboring images.

While the technique described in this US patent application provides an alternative to performing motion estimation, it has a number a drawbacks, for example in terms of complexity, and the resulting image quality.

There is thus a need in the art for an improved method and device for performing high-resolution image reconstruction.

2. Description of the Related Art

The present disclosure relates to a method and device for performing super-resolution image reconstruction, and in particular to a method and device for generating a super-resolution image from one or more low-resolution images.

SUMMARY

It is an aim of embodiments of the present disclosure to at least partially address one or more needs in the prior art.

According to one aspect, there is provided a method of generating a super-resolution image by a processing device, the method comprising: up-scaling an input image to generate an up-scaled image; and modifying the pixel value of a first pixel of the up-scaled image by: generating a similarity value for each of a plurality of candidate pixels in said input image and/or in one or more further input images, the candidate pixels being chosen based on the position of said first pixel in said up-scaled image, the similarity value being generated by evaluating the similarity of a group of surrounding pixels of each of said candidate pixels with a group of surrounding pixels of said first pixel; selecting a first subset of said candidate pixels based on said similarity values; and generating the modified pixel value of said first pixel based on the pixel values and similarity values of said first subset of candidate pixels.

According to one embodiment, selecting the first subset of the candidate pixels comprises selecting a plurality of the candidate pixels having the highest similarity values.

According to another embodiment, selecting the first subset of the candidate pixels comprises comparing the similarity value of each candidate pixel with a threshold value, and selecting each candidate pixel based on said comparison.

According to a further embodiment, the method further comprises modifying the pixel value of a second pixel of the up-scaled image by: selecting, based on the position of said second pixel in said up-scaled image, a plurality of further candidate pixels in said input image and/or in one or more further input images; generating a similarity value for each further candidate pixel by evaluating the similarity between a group of surrounding pixels of said second pixel and a group of surrounding pixels of each of said further candidate pixels; and generating the modified pixel value of said second pixel based on the pixel and similarity values of all of said further candidate pixels.

According to a further embodiment, the method further comprises modifying the pixel value of a second pixel of the up-scaled image by: selecting, based on the position of said second pixel in said up-scaled image, a plurality of further candidate pixels in said input image and/or in one or more further input images; generating a similarity value for each further candidate pixel by evaluating the similarity between a group of surrounding pixels of said second pixel and a group of surrounding pixels of each of said further candidate pixels; selecting a second subset of said further candidate pixels, said second subset containing more candidate pixels than said first subset; and generating the modified pixel value of said second pixel based on the pixel and similarity values of all of said second subset of candidate pixels.

According to a further embodiment, the method further comprises: determining uniform and non-uniform zones in the up-scaled image, wherein the first pixel is determined to fall within a non-uniform zone, and the second pixel is determined to fall within a uniform zone; and modifying the pixel value of a third pixel based on candidate pixels selected based on whether it falls within a uniform or non-uniform zone.

According to a further embodiment, determining the uniform and non-uniform zones comprises determining a uniformity value ($h_k$) for at least one block of pixels of said image based on the following equation:

$$h_k = |\det(A_k) - \alpha \cdot [\text{trace}(A_k)]^2|$$

where $A_k$ is the covariance matrix of the block of pixels, $\det(A_k)$ is the determinant of the matrix $A_k$, $\text{trace}(A_k)$ is the trace of matrix $A_k$, and α is a constant.

According to a further embodiment, the modified pixel value of said first pixel is generated by calculating a weighted mean of the pixel values of the candidate pixels by weighting the pixel values of the candidate pixels of said subset based on the similarity values summing the weighted pixel values.

According to a further embodiment, the modified pixel value of said first pixel is generated based on the following formula:

$$x_i = \frac{\sum_{y_j \in \Omega(i)} w_{ij} y_j}{\sum_{y_j \in \Omega(i)} w_{ij}}$$

where $w_{ij}$ is the similarity value of the candidate pixel $y_j$, and $x_i^*$ is said modified pixel value.

According to a further embodiment, the modified pixel value of the first pixel is generated by determining a weighted median of the pixel values of the candidate pixels based on a cumulative sum of the similarity values of candidate pixels having pixel values above and/or below said weighted median.

According to a further embodiment, the modified pixel value of said first pixel is generated based on the following formula:

$$\sum_{y_j \leq x_i^*} w_{ij} = A \cdot \sum_{y_j \geq x_i^*} w_{ij}$$

where A is a constant, $w_{ij}$ is the similarity value of the candidate pixel $y_j$, and $x_i^*$ is said modified pixel value.

According to a further embodiment, the method further comprises down-scaling said up-scaled image in order to generate the surrounding pixels of said first pixel.

According a further embodiment, the similarity values are determined based on the following calculation:

$$W_{ij} = \exp\left(-\frac{d_E^2(Px_i, Py_j)}{2\sigma_w^2}\right)$$

where $\sigma_w$ is a constant, $d_E 2$ is the Euclidean distance squared, $Px_i$ is the group of surrounding pixels of said first pixel and $Py_j$ is the group of surrounding pixels of each of said candidate pixels.

According to a further aspect, there is provided a device for generating a super-resolution image comprising a processing device configured to: up-scale an input image; and modify the pixel value of a first pixel of the up-scaled image by: generating a similarity value for each of a plurality of candidate pixels in said input image and/or in one or more further input images chosen based on the position of said first pixel in said up-scaled image, the similarity value being generated by evaluating the similarity of a group of surrounding pixels of each of said candidate pixels with a group of surrounding pixels of said first pixel; selecting a subset of said candidate pixels based on said similarity values; and generating the modified pixel value of said first pixel based on the pixel values and similarity values of said subset of candidate pixels.

According to yet a further aspect, there is provided a computer-readable medium storing a computer program that, when executed by a processing device, causes the above method to be implemented.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION

Figure 1:
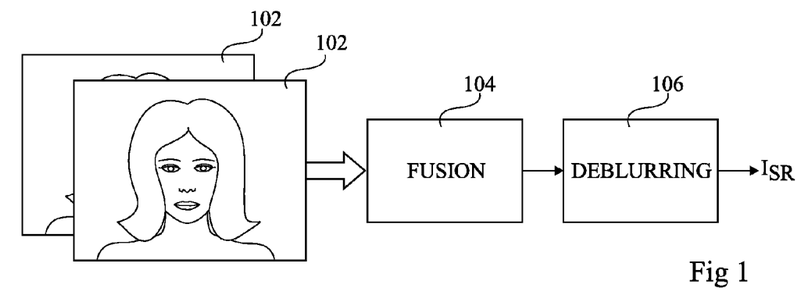
FIG. 1 is a block diagram schematically representing a super-resolution image reconstruction method according to an example embodiment.

FIG. 1 schematically illustrates an example of the principal steps in a method for performing super-resolution image reconstruction. As illustrated, one or more low resolution images 102 are provided to a fusion module 104. The term "low-resolution" as used herein is not limited to any specific resolution, but merely designates an image that has a lower resolution than the super-resolution image to be generated. Furthermore, the term "image" is used herein to designate a set of pixel values corresponding to a 2D array, but in alternative embodiments, an "image" could include other types of signals, such as those captured by an electronic retina.

While a super-resolution image is often generated based on at least two low-resolution input images, in some cases it could be generated from a single low-resolution image. In particular, there are many situations in which different areas of a same low-resolution image may be used to increase the overall image resolution, for example in the case of images containing patterns that repeat multiple times throughout the image.

The fusion module 104 applies a fusion method to the low-resolution image or images, in order to extract pixel information that is used to modify pixels in an up-scaled image.

After fusion has been completed, the super-resolution image is provided to a deblurring module 106, which applies a deblurring algorithm in order to sharpen the image, and generates the final super-resolution image ISR. In particular, the fusion method often leads to an attenuation of higher frequencies in the image, which can be compensated by the deblurring module.

The following description will focus on the fusion method implemented by module 104. Debinning algorithms are well known to those skilled in the art, and will not be described in detail herein.

Figure 2:
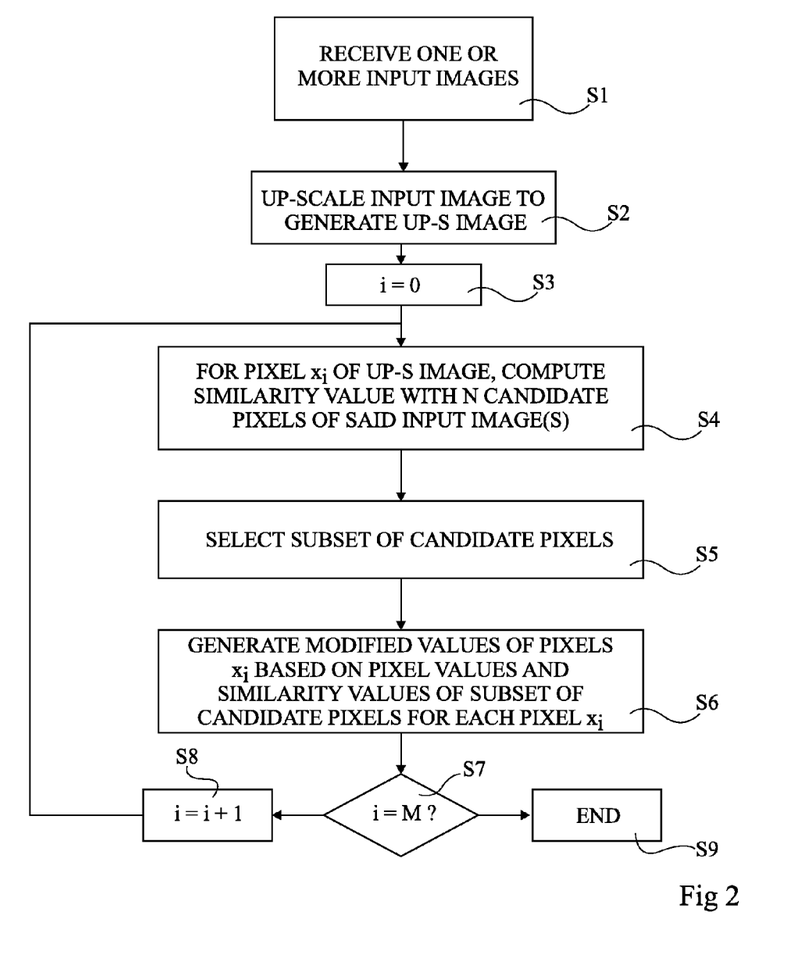
FIG. 2 is a flow diagram illustrating steps in a method of generating a super-resolution image according to an example embodiment.

FIG. 2 is a flow diagram illustrating steps in a method of generating a super-resolution image according to an example embodiment, and in particular the steps for performing the fusion operation 104 of FIG. 1. In particular, the technique involves modifying the pixel values of an up-scaled image to generate a super-resolution image.

The steps of the method of FIG. 2 will be described with reference also to FIG. 3, which illustrates a portion of an up-scaled image 302, and a portion of a low-resolution image 308.

In a first step S1 of FIG. 2, one or more input images are received. For example, the one or more input images correspond to the single low-resolution image or sequence of low-resolution images 102 of FIG. 1. In the case of a sequence of low-resolution images, each of the images for example has the same resolution.

In the next step S2, one of the low-resolution images is up-scaled to provide an up-scaled image. If there is a single low-resolution input image, then this image is up-scaled. Alternatively, if there is a sequence of low-resolution images corresponding to frames of a video sequence, an image at or close to the mid-point of the image sequence is for example selected to be up-scaled, such that the up-scaled image is one that is relatively similar to each of the other input images.

Figure 3:
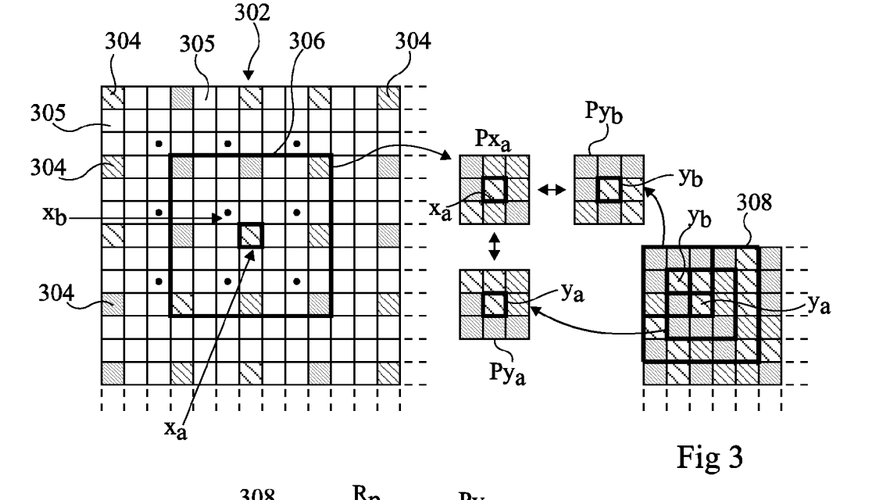
FIG. 3 illustrates a portion of an up-scaled image and of a low resolution image according to an example embodiment.

An example of a portion of such an up-scaled image 302 is illustrated on the left in FIG. 3. The pixels 304 of the up-scaled image 302, which are shown as squares filled with striped shading, represent those originating directly from a low-resolution image. The intermediate pixels 305, which are shown as empty or dotted squares in FIG. 3, for example have pixel values generated by an interpolation algorithm applied during the up-scaling operation. For example, the Lanczos interpolation algorithm could be used, or an alternative interpolation algorithm as will be known by those skilled in the art. In the example of FIG. 3, the up-scaled image has three times as many pixels in each of the horizontal and vertical directions as the original image. However, many other up-scaling ratios could be used.

Referring again to FIG. 2, in the next step S3, a variable i is initiated, for example at zero.

In a subsequent step S4, for the pixel xi of the up-scaled image, a similarity value is computed with N candidate pixels selected from the input image or images. The candidate pixels are for example determined based on the position of the pixel $x_i$ in the up-scaled image. The number N of candidate pixels can be chosen based on various factors, such as the number of input images, the time interval between the capture time of the images, the resolution of the input images, etc.

The similarity between the pixel xi and each candidate pixel is evaluated based on a pixel patch $P_x$ of pixels extracted from the up-scaled image 302 by a down-sampling operation. For example, the resolution of the pixel patch $P_x$ is equal to that of the low-resolution image from which the up-scaled image was generated. In the example of FIG. 3, for a pixel $x_a$ of the up-scaled image 302, a block 306 of pixels is down-sampled to generate a patch $Px_a$ corresponding to a three-by-three block of pixels, having the pixel $x_a$ as its central pixel. In this example, the patch $Px_a$ comprises all pixels taken directly from the low-resolution image used to generate the up-scaled image 302.

The patch $P_x$ is compared to a patch corresponding to each of the candidate pixels. In the example of FIG. 3, a candidate pixel $y_a$ is taken from a low resolution image 308 and has a same pixel position as the pixel $x_a$ in the input low-resolution image. A patch $Py_a$ is extracted corresponding to a block of three-by-three pixels having pixel $y_a$ as its central pixel. The patch $Py_a$ is compared to the patch $Px_a$ to determine their similarities, for example by calculating their Euclidean distance as described in more detail below.

Similarly, the patch $Px_a$ is compared to other patches corresponding to other candidate pixels in the low-resolution image 308 and/or in other low-resolution images. FIG. 3 shows an example of a further patch $Py_b$, associated with a candidate pixel $y_b$ one pixel above and to the left of the pixel $y_a$ in the low-resolution image 308.

In some embodiments, candidate pixels are also taken from the low resolution image that was used to generate the up-scaled image 302. For the pixels xi of the up-scaled image that correspond to pixels of this low resolution image, such as the pixel $x_a$, the candidate patch will correspond exactly to the reference patch, leading to a perfect similarity. This will not be the case however for the interpolated pixels of the up-scaled image, such as the pixel $x_b$.

Similarity values are determined for the other pixels xi of the up-scaled image in a similar fashion to pixel $x_a$. For example, in the case of a pixel $x_b$ one pixel above and to the left of pixel $x_a$ in the up-scaled image 302, the patch $Px_b$ for example corresponds to the nine pixels shown with dots in FIG. 3, each of which contains an interpolated value.

In one example, for a pixel xi to be modified in the up-scaled image, the candidate pixels are selected to be those within a search window a certain distance from the pixel $y_j$ located at a location corresponding to that of the pixel xi, as will now be described with reference to FIG. 4.

Figure 4:
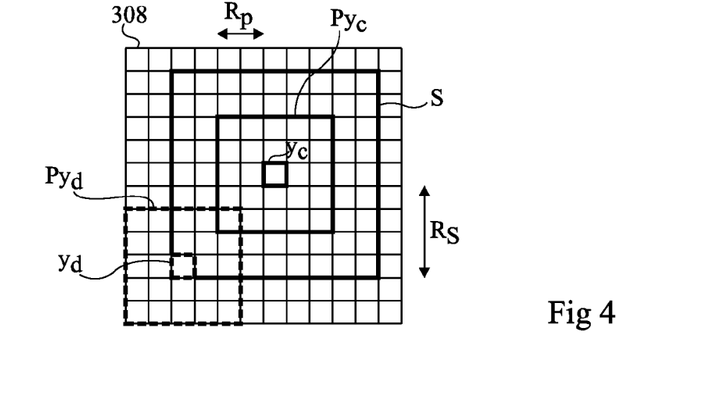
FIG. 4 illustrates an example of a search window used in a method of super-resolution image reconstruction according to an example embodiment.

FIG. 4 illustrates an example of the generation of the patches from the low-resolution image 308 of FIG. 3. As illustrated, in this example a patch $Py_c$ has a radius of $R_p$ from the central pixel $y_c$, and assuming that the patch is square, the patch thus has the dimensions of $(2R_p+1)$ by $(2R_p+1)$. All of the patches for example have the same patch radius, which is for example chosen to be between 1 and 10 pixels. The number of patches compared to the reference patch is determined by the size of the search window S from which the patches are extracted. The search window S in the low resolution image 308 for example corresponds to candidate pixels falling within a radius $R_s$ from the central pixel. In the example of FIG. 4, an example of a candidate pixel $y_d$ falling in the bottom left corner of the search window is illustrated with a corresponding patch $Py_d$. Thus, a square search window for example has dimensions $(2R_s+1)$ by $(2R_s+1)$, and thus would generate a total of $(2R_s+1)^2$ of patches. The search window radius is for example between 1 and 10 pixels. In some embodiments, the search window radius can be selected based on the maximum movement between the image used to generate the up-scaled image 302 and each of the other images. A similar or the same search window is for example used for each low resolution input image.

An example of the steps performed in step S4 of FIG. 2 will now be described in more detail with reference to FIG. 5.

Figure 5:
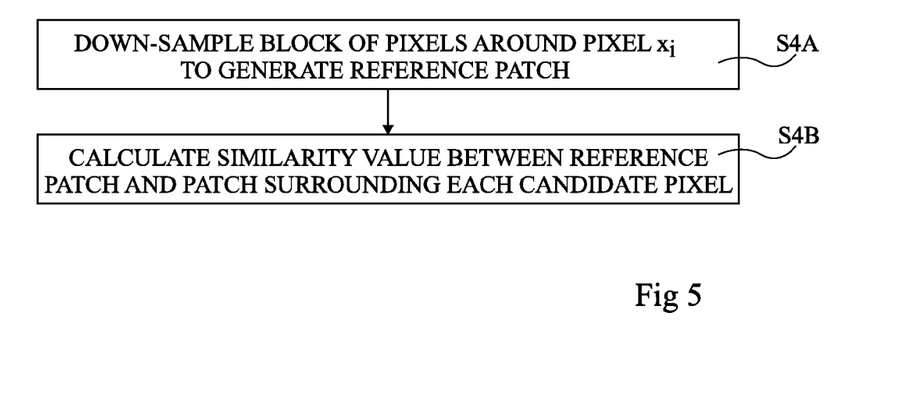
FIG. 5 is a flow diagram illustrating a step in the method of FIG. 2 in more detail according to an example embodiment.

FIG. 5 is a flow diagram illustrating the step S4 of FIG. 2 in more detail according to an example embodiment in which the similarity value is calculated using the Euclidean distance.

Initially, in a sub-step S4A, a block of pixels surrounding the pixel xi in the up-scaled image is down-sampled to generate the reference patch $Px_i$.

In a subsequent sub-step S4B, the similarity value between the reference patch and a patch $Py_j$ surrounding each candidate pixel is calculated, based on the Euclidean distance $d_E$. For example, the similarity value is determined by the following calculation:

$$W_{ij} = \exp\left(-\frac{d_E^2(Px_i, Py_j)}{2\sigma_w^2}\right)$$

where $\sigma_w$ is a constant that controls the weights and hence determines the contributions of neighbouring pixels, and "$d_E^2(\ )$" is the Euclidean distance squared, which is for example calculated as:

$$d_E^2(P_{x_i}, P_{y_j}) = \frac{1}{N_{patch}} \sum_{k \in patch} (P_{x_i}(k) - P_{y_j}(k))^2$$

where $N_{patch}$ is the number of pixels forming each patch.

In alternative embodiments, other algorithms could be used to calculate the similarity between the patches.

As one example, the following table I below provides a list of candidate pixels and associated similarity values.

TABLE I

| Candidate Pixel | Pixel Value | Similarity Value |
| --- | --- | --- |
| $y_1$ | 199 | 0.56 |
| $y_2$ | 244 | 0.52 |
| $y_3$ | 212 | 0.61 |
| $Y_4$ | 165 | 0.66 |
| $Y_5$ | 207 | 0.85 |
| $Y_6$ | 177 | 0.69 |
| $Y_7$ | 199 | 0.89 |
| $y_8$ | 250 | 0.57 |
| $y_9$ | 166 | 0.49 |

For example, in this table, the candidate pixels y1 to y9 are the pixels forming a three-by-three pixel block, the pixel values are for example represented by 8 bits, and thus each have a value falling in the range 0 to 255, and the similarity values are for example on a scale between 0 and 1, values close to 0 indicating very little similarity, and values close to 1 indicating very high similarity.

Referring again to FIG. 2, after the step S4, the next step is S5, in which a subset of the candidate pixels is selected. For example, for this, a threshold value is used to eliminate certain candidates based on the similarity values. For example, a threshold value of 0.65 would eliminate all of the candidate pixels in Table I except for pixels y4 to y7. The same threshold value is for example used for all pixels. Alternatively, the candidate values may be ranked based on their similarity values, and only a number of the highest ranking candidates is selected. For example, between 90 and 10 percent of candidate values may be selected to form the subset of candidate pixels. An advantage of selecting a percentage of candidate pixels is that the selection is automatically adapted to the distribution of similarity values.

In a next step S6, a new pixel value is generated for each pixel xi based on the pixel values and candidate values of the subset of candidate pixels.

For example, taking the example of candidate pixels of table I above, and assuming that a threshold of 0.65 is used to select the subset of candidate pixels, the subset of candidate pixels for example comprises those of table II below, which have been ranked based on the pixel value for each candidate pixel.

TABLE II

| Candidate Pixel | Pixel Value | Similarity Value | Weighted Pixel Value |
| --- | --- | --- | --- |
| $Y_5$ | 207 | 0.85 | 176.0 |
| $Y_7$ | 199 | 0.89 | 177.1 |
| $Y_6$ | 177 | 0.69 | 122.1 |
| $Y_4$ | 165 | 0.66 | 108.9 |

The weighted pixel value is for example determined for each candidate pixel of the subset by multiplying each pixel value by its corresponding similarity value. The new pixel value xi is then for example calculated as a weighted mean of the pixel values, for example based on the following calculation:

$$x_i = \frac{\sum_{y_j \in \Omega(i)} w_{ij} y_j}{\sum_{y_j \in \Omega(i)} w_{ij}}$$

where $y_j$ are the candidate pixels of the subset $\Omega(i)$, and $W_{ij}$ is the similarity value for each candidate pixel of the subset. Taking the values provided as an example in Table II above, the sum of weighted pixel values is thus 584.1, and the sum of similarity values is thus 3.09, and the modified pixel value can be calculated as being equal to 189. Thus, whereas the mean of the four candidate pixel values is equal to 187, after more heavily weighting the most similar candidates, a more accurate pixel value is achieved.

In an alternative embodiment, rather than taking a weighted mean of the pixel values of the subset of candidate values, the modified pixel value could be calculated as a weighted median pixel value xi* among the subset of candidate values. In particular, the weighted median pixel value xi* is for example chosen to satisfy the following relation:

$$\sum_{y_j \leq x_i^*} w_{ij} = A \cdot \sum_{y_j \geq x_i^*} w_{ij}$$

where A is a constant and $w_{ij}$ is the similarity value of the candidate pixel $y_j$.

In some embodiments, the constant A is equal to 1. In other words, the weighted median value xi* corresponds to the pixel value of the candidate pixel for which the cumulative sum of the similarity values for candidate pixels having a pixel value lower than the weighted median value xi* equals the cumulative sum of the similarity values for candidates pixels having a pixel value higher that the weighted median value xi*.

Alternatively, the constant A could be equal to a value other than 1, for example such that the cumulative sum of the similarities below the value xi* is between 40 and 60 percent of the total sum of similarities. Thus A is for example equal to between 0.667 and 1.5.

More often than not, there will be a single weighted median candidate pixel. Indeed, calculating the cumulative sum of the similarity values from the lowest candidate pixel value towards the highest, it will generally be that the limit determined by the constant A will be exceeded when the similarity value of an nth candidate pixel is added to the cumulative sum. Indeed, if the cumulative sum is instead calculated starting with the highest candidate pixel value and going towards the lowest, the threshold value will be reached when the similarity value of the same nth candidate pixel is added to the cumulative sum. This nth candidate pixel thus for example provides the weighted median value.

As an example, assuming that the constant A is equal to 1, the threshold cumulative similarity value is equal to 50 percent of the total sum of similarity values. Taking the example of Table II above, the threshold cumulative similarity value is thus 3.09/2=1.545. The median pixel value is thus that of pixel Y7, equal to 199 in this example.

In some cases however, after adding the similarity value of the nth candidate pixel, the cumulative score may equal exactly the limit value determined by the constant A. In this case, the weighted median value is for example calculated as the mean of the nth and (n+1)th candidate pixel values.

For example, taking the example of Table II above in the case that the constant A is equal to 0.776, the limit for the cumulative sum of the similarity values starting from the lowest candidate value will be equal to (A/A+1)×3.09=1.35. Because this limit will be reached exactly by the sum of the similarity values of pixels y4 and y6 in table II, the weighted median value is for example chosen to be the mean of values y6 and y7, i.e. (177+199)/2=188.

Referring again to FIG. 2, in a subsequent step S7, it is determined whether the variable i is equal to M, for example there being a total of M+1 pixels in the up-scaled image. If not, the next step is S8, in which the variable i is incremented, and then the method returns to step S4. Alternatively, once the final pixel $x_M$ of the image has been processed, the step after S7 is step S9, in which the fusion method ends and deblurring is for example performed on the generated image, as described above with reference to FIG. 1.

Figure 6:
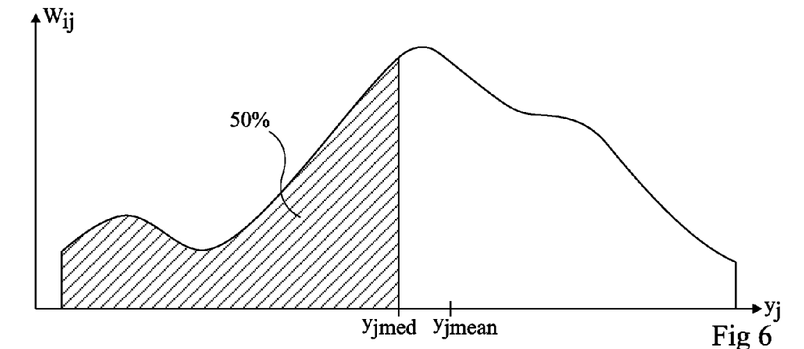
FIG. 6 is a graph illustrating an example of the selection of a median pixel value according to an example embodiment.

FIG. 6 is a graph illustrating the similarity values $W_{ij}$ plotted against the pixel values $y_j$. It should be noted that for a given pixel value, there may be more than one candidate pixel represented by points on the curve. As represented in this figure, in the case that the constant A is equal to 1, the median pixel value corresponds to the value for which the area under the curve on either side if this value is equal, i.e. equal to 50 percent of the total area under the curve. An example of the weighted mean value $y_{jmean}$ is also illustrated in FIG. 6, which in this example is higher than the median value.

Figure 7:
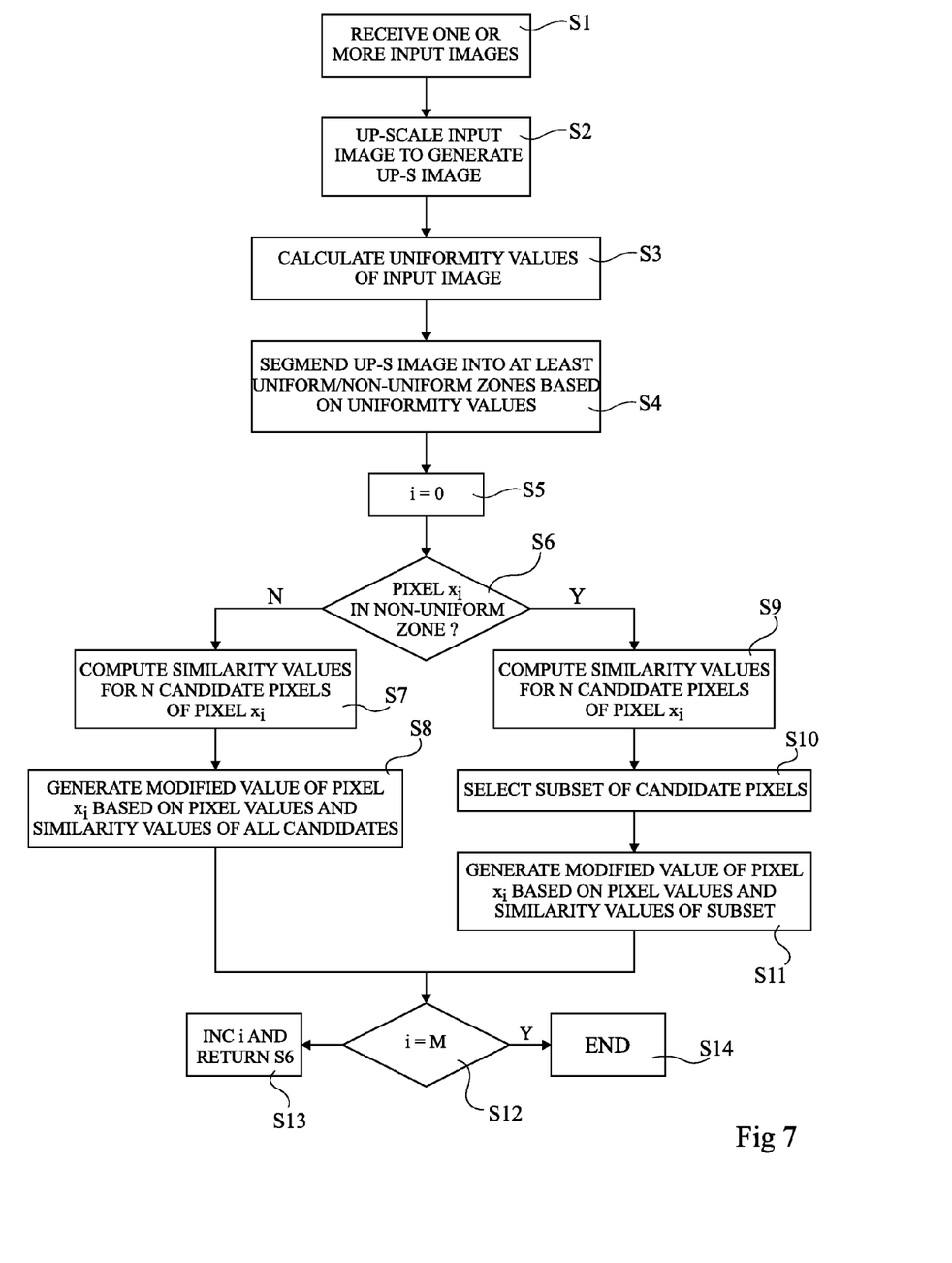
FIG. 7 is a flow diagram illustrating steps in a method of generating a super-resolution image according to a further example embodiment.

FIG. 7 is a flow diagram illustrating steps in an alternative method of generating a super-resolution image to that of FIG. 2.

The initial steps S1 and S2 of receiving one or more input images and up-scaling an input image are the same as the corresponding steps of FIG. 2, and will not be described again in detail.

In a subsequent step S3 of FIG. 7, uniformity values are calculated for the low-resolution input image used to generate the up-scaled image. For this, the input image is for example divided into blocks of pixels, and the absolute Harris value is for example calculated for each block. The application of the Harris value for corner and edge detection is for example described in more detail in the technical publication entitled "A combined corner and edge detector", C. Harrys and M. Stephens, proceeding of 4th Alvey Vision Conference, pages 147-151.

In one example, initially a Gaussian low-pass filter, for example of size five-by-five pixels, is applied to the low-resolution image. Then, horizontal derivatives IH and vertical derivatives IV are for example calculated in the filtered image for every pixel value.

Then, for each block k of the low-resolution image, where k is for example an eight-by-eight block of pixels, a covariance matrix is for example generated as follows:

$$A_k = \begin{bmatrix} \langle I_H^2 \rangle_k & \langle I_H I_V \rangle_k \\ \langle I_H I_V \rangle_k & \langle I_k^2 \rangle_k \end{bmatrix}$$

where is the mean value for the block k.

The absolute Harris value $h_k$ is then for example calculated for each block k based on this covariance matrix using the following equation:

$$h_k = |\det(A_k) - \alpha \cdot [\text{trace}(A_k)]^2|$$

where $\det(A_k)$ is the determinant of the matrix $A_k$, trace $(A_k)$ is the trace of matrix $A_k$, and α is a constant. Based on the absolute Harris value calculated for each block k, a binary uniformity value is for example calculated for each block by comparing the absolute Harris value to a threshold value. For example, the uniformity values are calculated by applying the following rule:

$$U(p_k) = \begin{cases} 0 & \text{if } h_k \geq \gamma \cdot \max\{h_k\} \\ 1 & \text{otherwise} \end{cases}$$

where $P_k$ are the pixels of block k, γ is a constant, and $\gamma \cdot \max\{h_k\}$ is the threshold value, where $\max\{h_k\}$ is the highest Harris value for all of the blocks in the image.

Referring again to the flow diagram of FIG. 7, in a subsequent step S4, the up-scaled image generated in step S2 is segmented into uniform and non-uniform zones based on the uniformity values generated in step S3. For example, for each block k of the low-resolution input image, it is determined that a corresponding block of pixels of the up-scaled image is a non-uniform zone if the uniformity value is equal to 0, or a uniform zone if the uniformity value is equal to 1.

In a subsequent step S5, a variable i is for example initiated to 0.

Then, in a subsequent step S6, it is determined whether or not the pixel xi of the up-scaled image is in a non-uniform zone. If not, the next step is S7, in which similarity values are computed in a similar fashion as described above with reference to step S4 of FIG. 2.

After step S7, the next step is step S8, in which a modified value of pixel xi is generated based on pixel value and similarity values of all of the N candidate pixels. In particular, the techniques for generating this modified pixel value, which could be based on a weighted mean or weighted median value, are for example the same as those described above with reference to step S5 of FIG. 2 and to Tables I and II, except that all of the candidate pixels are considered, rather than only those of a selected subset.

Alternatively, if in step S6 the pixel xi is determined to be non-uniform, the next step is S9, in which again the similarity values are computed for all N candidate pixels.

However, the step after S9 is step S10, in which a subset of the candidate pixels is selected in a similar fashion as described above in relation to step S5 of FIG. 2.

After step S10, the next step is S11, which is similar to S6 of FIG. 2 described above, in which a new value of pixel xi is generated based on the selected subset of candidate pixel values.

After steps S8 and S11, the next step is S12, in which it is determined whether variable i is equal to M, for example there being a total of M+1 pixels in the up-scaled image. If not, the next step is S13, in which the variable i is incremented, and the method returns to S6. Alternatively, when i is equal to M, the method for example ends at step S14, and deblurring is for example performed on the generated image, as described above with reference to FIG. 1.

In an alternative implementation, rather than generating a new pixel value based on all candidate pixels, in step S8 of FIG. 7, the modified pixel value could be calculated based on a bigger subset of candidate pixels than the one selected in step S10. For example, the subset of candidate pixels selected for pixels in the non-uniform zones could be selected based on a first threshold value or a first percentage of candidates, and the subset of candidate pixels selected for pixels in the uniform zones could be selected based on a second threshold value lower than the first threshold value, or a second percentage of candidates higher than the first percentage.

Thus, the flow diagram of FIG. 7 illustrates an example in which one of two pixel modification methods is used based on whether or not each pixel corresponds to a uniform or non-uniform zone. In some embodiments, border zones are additionally defined at the of FIG. 6, and xi2(p) is the modified boundary between the uniform and non-uniform zones. The pixels in such border zones are for example processed based on a mix of the two pixel modification methods.

For example, for the pixels in the border zones, the following rule is applied:

$$x_i = (1 - U(p)) \cdot x_{i1}(p) + U(p) \cdot x_{i2}(p)$$

where xi1(p) is the modified pixel value generated by the method corresponding to steps S9 to S11 pixel value generated by the method corresponding to steps S7 and S8 of FIG. 6. U(p) is the uniformity value for the pixel in question, and in the border zones, this value is for example equal to 0.5, such that the weighting applied to the two pixel generation methods is equal. Alternatively, a more gradual transition from the uniform to non-uniform zone could be achieved by progressively decreasing U(p) from 1 to 0 across the uniform to non-uniform boundary.

Figure 8:
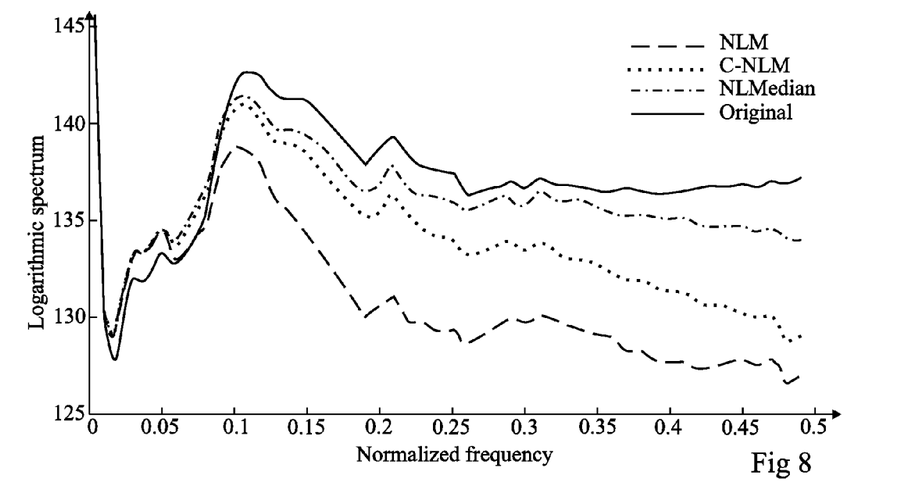
FIG. 8 is a graph illustrating an example of results obtained by the methods described in the present disclosure according to an example embodiment.

FIG. 8 is a graph illustrating an example of the results that have been achieved by applying the super-resolution image generation techniques described herein. In particular, this graph plots the logarithmic spectrum against the normalized frequency, which is a radial spatial frequency, i.e. at each spatial frequency the spectrum is obtained from the spectra summed over all orientations. In other words, a 2D spectrum of the image is calculated, with spectrum center (DC) being the average value. Then, the ordinates of the radial spectrum at abscissa R are computed as the sum of the 2D spectrum ordinates for each point that lies at an equal distance R from the spectrum center.

A solid line in FIG. 8 represents an original image. In other words, for the purpose of obtaining the graph of FIG. 8, an original high resolution image was analyzed to provide the solid line curve of FIG. 8, and then down-sampled to generate low resolution input images. In particular, in the examples of FIG. 8, noise of standard deviation 10 was added to an image measuring 512 by 512 pixels. The noisy image was then shifted and down-sampled by a factor of 3 in each dimension to generate each of nine low resolution images.

An important indicator of the performance of a super-resolution image construction technique is the extent to which the spatial spectrum of the resulting image matches that of the original/ideal image.

A dashed line in FIG. 8 represents the result obtained from applying what will be referred to as the "non-local mean" (NLM) method of generating the super-resolution image, which corresponds to the technique described above with respect to FIG. 2, except that the modified pixel value is calculated based on the weighted mean of all candidate pixels, rather than only on a selected subset of candidates. As illustrated, the resulting spatial frequency spectrum in the image is relatively far from that of the original image.

A dotted line in FIG. 8 represents the result obtained from applying what will be referred to as the "constrained non-local mean" (C-NLM) method, which corresponds to the method described in relation to FIG. 7, based on a weighted mean of all of the candidate pixels in uniform zones, and of a selected subset of candidate pixels in non-uniform zones. The result is much improved with respect to the NLM method.

A dashed-dotted line in FIG. 8 represents the result obtained from using the weighted median candidate pixel described with reference to FIG. 6, in combination with the constrained non-local mean method. It will be observed that the result is particularly close to that of the original image.

Figure 9:
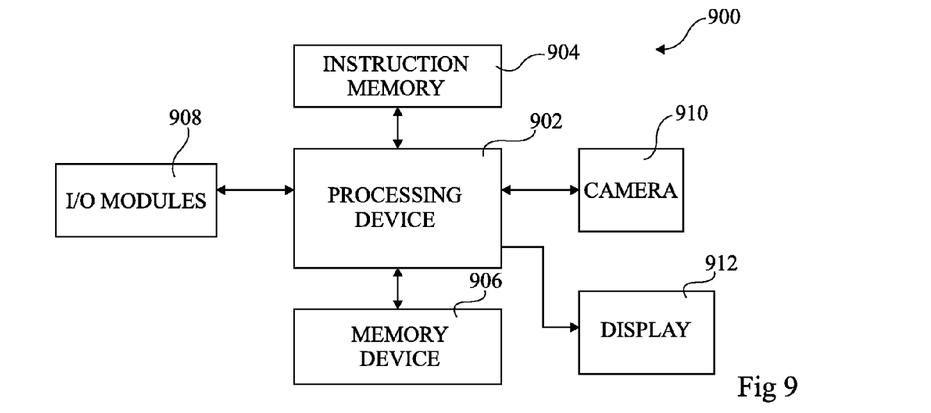
FIG. 9 schematically illustrates an electronic device for implementing the methods described herein.

FIG. 9 schematically illustrates, in block diagram form, a device 900 suitable for implementing the methods as described herein.

The device 900 comprises a processing device 902, which for example comprises one or more processors capable of executing instructions stored in an instruction memory 904 coupled to the processing device 902. The execution of these instructions causes the methods as described herein, for example the method represented by the flow diagrams of FIGS. 2, 5 and 7, to be implemented.

The processing device 902 is for example further coupled to a memory device 906 storing the input images to be processed as well as the final super-resolution image, and any intermediate images generated during the methods. One or more input/output modules 908, such as input/output ports, a keyboard and/or mouse, touch screen etc., are also for example coupled to the processing device 902. Furthermore, in some embodiments, a camera 910 is coupled to the processing device for capturing low resolution input images to be used to reconstruct the super resolution image. The camera 910 could comprise an image sensor array, such as a CMOS image sensor, or another type of sensor array, such as those used in electronic retina. Furthermore, a display 912 is for example provided for displaying the various images.

Thus the embodiments described herein provide a method and device for generating a super-resolution image having an improved image quality and reduced complexity with respect to prior solutions. In particular, by choosing candidate pixels based on the location of the pixel to be modified, and then filtering these candidate pixels to select a subset to be used in generating the modified pixel value, an over-smoothing of the image is avoided, and the pixel calculation is simplified.

Furthermore, by selecting the modified pixel value as a weighted median candidate pixel based on the similarity values, a further improvement in the image quality may be achieved.

Furthermore, by modifying pixels present in non-uniform zones of the image based on a subset of the candidate pixels, and those present in uniform zones of the image based on all candidate pixels, the image quality is further improved.

Having thus described at least one illustrative embodiment of the invention, various alterations, modifications and improvements will readily occur to those skilled in the art.

For example, while examples have been described in which the pixel value of each pixel in the up-scaled image is modified to generate the super-resolution image, it will be apparent to those skilled in the art that in some cases some zones of the image may be excluded from pixel modification altogether.

Furthermore, while the example embodiments detail the generation of a super-resolution image based on more than one low-resolution input image, it will be apparent to those skilled in the art how the described techniques can be applied to the case of a single low-resolution input image. For example, in the case of a single image, the candidate pixels are chosen to be all those of the input image. Alternatively, the size of the search window is determined based on the image characteristics.

The invention claimed is:

1. A method of generating a super-resolution image by a processing device, the method comprising:
    up-scaling an input image to generate an up-scaled image; and
    modifying the pixel value of a first pixel of the up-scaled image by:
        generating a similarity value for each of a plurality of candidate pixels in said input image and/or in one or more further input images, the candidate pixels being chosen based on the position of said first pixel in said up-scaled image, the similarity value being generated by evaluating the similarity of a group of surrounding pixels of each of said candidate pixels with a group of surrounding pixels of said first pixel;
        selecting a first subset of said candidate pixels based on said similarity values; and
        generating the modified pixel value of said first pixel based on the pixel values and similarity values of said first subset of candidate pixels.

2. The method of claim 1, wherein selecting said first subset of the candidate pixels comprises selecting a plurality of the candidate pixels having the highest similarity values.

3. The method of claim 1, wherein selecting said first subset of the candidate pixels comprises comparing the similarity value of each candidate pixel with a threshold value, and selecting each candidate pixel based on said comparison.

4. The method of claim 1, further comprising modifying the pixel value of a second pixel of the up-scaled image by:
    selecting, based on the position of said second pixel in said up-scaled image, a plurality of further candidate pixels in said input image and/or in one or more further input images;
    generating a similarity value for each further candidate pixel by evaluating the similarity between a group of surrounding pixels of said second pixel and a group of surrounding pixels of each of said further candidate pixels; and
    generating the modified pixel value of said second pixel based on the pixel and similarity values of all of said further candidate pixels.

5. The method of claim 1, further comprising modifying the pixel value of a second pixel of the up-scaled image by:
    selecting, based on the position of said second pixel in said up-scaled image, a plurality of further candidate pixels in said input image and/or in one or more further input images;
    generating a similarity value for each further candidate pixel by evaluating the similarity between a group of surrounding pixels of said second pixel and a group of surrounding pixels of each of said further candidate pixels;
    selecting a second subset of said further candidate pixels, said second subset containing more candidate pixels than said first subset; and
    generating the modified pixel value of said second pixel based on the pixel and similarity values of all of said second subset of candidate pixels.

6. The method of claim 4, further comprising:
    determining uniform and non-uniform zones in said up-scaled image, wherein said first pixel is determined to fall within a non-uniform zone, and said second pixel is determined to fall within a uniform zone; and
    modifying the pixel value of a third pixel based on candidate pixels selected based on whether it falls within a uniform or non-uniform zone.

7. The method of claim 6, wherein determining said uniform and non-uniform zones comprises determining a uniformity value for at least one block of pixels of said image based on the following equation:

$$h_k = |\det(A_k) - \alpha \cdot [\text{trace}(A_k)]^2|$$

where $A_k$ is the covariance matrix of the block of pixels, $\det(A_k)$ is the determinant of the matrix $A_k$, $\text{trace}(A_k)$ is the trace of matrix $A_k$, and $\alpha$ is a constant.

8. The method of claim 1, wherein the modified pixel value of said first pixel is generated by calculating a weighted mean of the pixel values of the candidate pixels by weighting the pixel values of the candidate pixels of said subset based on the similarity values, and by summing the weighted pixel values.

9. The method of claim 8, wherein said modified pixel value of said first pixel is generated based on the following formula:

$$x_i = \frac{\sum_{y_j \in \Omega_{ij}} x_{ij} y_j}{\sum_{y_j \in \Omega_{ij}} y_{ij}}$$

where $w_{ij}$ is the similarity value of the candidate pixel $y_j$, and $x_i$ is said modified pixel value.

10. The method of claim 1, wherein the modified pixel value of said first pixel is generated by determining a weighted median of the pixel values of the candidate pixels based on a cumulative sum of the similarity values of candidate pixels having pixel values above and/or below said weighted median.

11. The method of claim 10, wherein the modified pixel value of said first pixel is generated based on the following formula:

$$\sum_{y_j \leq x_i^*} w_{ij} = A \cdot \sum_{y_j \geq x_i^*} w_{ij}$$

where A is a constant, $w_{ij}$ is the similarity value of the candidate pixel $y_j$, and $x_i^*$ is said modified pixel value.

12. The method of claim 1, further comprising down-scaling said up-scaled image in order to generate the surrounding pixels of said first pixel.

13. The method of claim 1, wherein said similarity values are determined based on the following calculation:

$$W_{ij} = \exp\left(-\frac{d_E^2(Px_i, Py_j)}{2\sigma_w^2}\right)$$

where $\sigma_w$ is a constant, $d_E^2$ is the Euclidean distance squared, $Px_i$ is the group of surrounding pixels of said first pixel and $Py_j$ is the group of surrounding pixels of each of said candidate pixels.

14. A device for generating a super-resolution image comprising a processing device configured to:
  up-scale an input image; and
  modify the pixel value of a first pixel of the up-scaled image by:
    generating a similarity value for each of a plurality of candidate pixels in said input image and/or in one or more further input images chosen based on the position of said first pixel in said up-scaled image, the similarity value being generated by evaluating the similarity of a group of surrounding pixels of each of said candidate pixels with a group of surrounding pixels of said first pixel;
    selecting a subset of said candidate pixels based on said similarity values; and
    generating the modified pixel value of said first pixel based on the pixel values and similarity values of said subset of candidate pixels.

15. A non-transitory computer-readable medium storing a computer program that, when executed by a processing device, causes a method of generating a super-resolution image to be implemented, the method comprising the steps of:
  up-scaling an input image to generate an up-scaled image; and
  modifying the pixel value of a first pixel of the up-scaled image by:
    generating a similarity value for each of a plurality of candidate pixels in said input image and/or in one or more further input images, the candidate pixels being chosen based on the position of said first pixel in said up-scaled image, the similarity value being generated by evaluating the similarity of a group of surrounding pixels of each of said candidate pixels with a group of surrounding pixels of said first pixel;
    selecting a first subset of said candidate pixels based on said similarity values; and
    generating the modified pixel value of said first pixel based on the pixel values and similarity values of said first subset of candidate pixels.

16. The device of claim 15, wherein selecting said first subset of the candidate pixels comprises selecting a plurality of the candidate pixels having the highest similarity values.

17. The device of claim 15, wherein selecting said first subset of the candidate pixels comprises comparing the similarity value of each candidate pixel with a threshold value, and selecting each candidate pixel based on said comparison.

18. The device of claim 15, wherein the processing device is further configured to modify the pixel value of a second pixel of the up-scaled image by:
  selecting, based on the position of said second pixel in said up-scaled image, a plurality of further candidate pixels in said input image and/or in one or more further input images;
  generating a similarity value for each further candidate pixel by evaluating the similarity between a group of surrounding pixels of said second pixel and a group of surrounding pixels of each of said further candidate pixels; and
  generating the modified pixel value of said second pixel based on the pixel and similarity values of all of said further candidate pixels.

19. The device of claim 15, wherein the processing device is further configured to modify the pixel value of a second pixel of the up-scaled image by:
  selecting, based on the position of said second pixel in said up-scaled image, a plurality of further candidate pixels in said input image and/or in one or more further input images;
  generating a similarity value for each further candidate pixel by evaluating the similarity between a group of surrounding pixels of said second pixel and a group of surrounding pixels of each of said further candidate pixels;
  selecting a second subset of said further candidate pixels, said second subset containing more candidate pixels than said first subset; and
  generating the modified pixel value of said second pixel based on the pixel and similarity values of all of said second subset of candidate pixels.

20. The device of claim 19, wherein the processing device is further configured to perform the following steps:
  determining uniform and non-uniform zones in said up-scaled image, wherein said first pixel is determined to fall within a non-uniform zone, and said second pixel is determined to fall within a uniform zone; and
  modifying the pixel value of a third pixel based on candidate pixels selected based on whether it falls within a uniform or non-uniform zone.

* * * * *